US011854745B2

(12) United States Patent
Yang et al.

(10) Patent No.: US 11,854,745 B2
(45) Date of Patent: Dec. 26, 2023

(54) MODIFIED NI—TI—TA DIELECTRIC MATERIAL FOR MULTI-LAYER CERAMIC CAPACITOR AND LOW-TEMPERATURE PREPARATION METHOD THEREOF

(71) Applicant: Yangtze Delta Region Institute (Huzhou), University of Electronic Science and Technology of China, Huzhou (CN)

(72) Inventors: YuanYuan Yang, Huzhou (CN); XiaoZhen Li, Kunming (CN); MengJiang Xing, Kunming (CN); YanLing Luo, Wuxi (CN); HongYu Yang, Xi'an (CN); QingYang Fan, Xi'an (CN); Hao Li, Beijing (CN); YunSheng Zhao, Shenzhen (CN)

(73) Assignee: Yangtze Delta Region Institute (Huzhou), University of Electronic Science and Technology of China, Huzhou (CN)

( * ) Notice: Subject to any disclaimer, the term of this patent is extended or adjusted under 35 U.S.C. 154(b) by 0 days.

(21) Appl. No.: 18/140,424

(22) Filed: Apr. 27, 2023

(65) Prior Publication Data
US 2023/0352239 A1 Nov. 2, 2023

(30) Foreign Application Priority Data
Apr. 29, 2022 (CN) .......................... 202210472444.X

(51) Int. Cl.
*H01G 4/02* (2006.01)
*C04B 35/626* (2006.01)
(Continued)

(52) U.S. Cl.
CPC ..... *H01G 4/1218* (2013.01); *C04B 35/62615* (2013.01); *C04B 35/64* (2013.01); *H01G 4/30* (2013.01)

(58) Field of Classification Search
USPC ..... 361/301.4, 321.1, 321.2, 321.4; 501/136, 501/137
See application file for complete search history.

(56) References Cited

U.S. PATENT DOCUMENTS 5,036,424 A * 7/1991 Yokotani ............... C04B 35/465
29/25.42

OTHER PUBLICATIONS

CNIPA, Notification of a First Office Action for CN202210472444.X, dated Oct. 19, 2022.
(Continued)

*Primary Examiner* — Arun Ramaswamy
(74) *Attorney, Agent, or Firm* — Zhigang Ma

(57) ABSTRACT

A modified Ni—Ti—Ta dielectric material for multi-layer ceramic capacitor (MLCC) and a low-temperature preparation method thereof are provided. By using characteristics that radii of the $Cu^{2+}$ ion and $(Al_{1/2}Nb_{1/2})^{4+}$ ion are close to those of Ni and Ti elements, respectively, $Cu^{2+}$, $Al^{3+}$ and $Nb^{5+}$ ions are introduced into a $Ni_{0.5}Ti_{0.5}TaO_4$ matrix for partial substitution, a negative temperature coefficient of dielectric constant of −220±30 ppm/° C. is provided while a sintering temperature is significantly reduced, and deterioration factors of loss caused by sintering aids is reduced, so that the dielectric material applied to radio frequency MLCC with low loss, low cost and good process stability is prepared.

3 Claims, 2 Drawing Sheets

(51) Int. Cl.
*C04B 35/64* (2006.01)
*H01G 4/30* (2006.01)
*H01G 4/12* (2006.01)

(56) References Cited

OTHER PUBLICATIONS

University of Electronic Science and Technology of China (Applicant), Reply to Notification of a First Office Action for CN202210472444.X, w/ (allowed) replacement claims, dated Nov. 16, 2022.

CNIPA, Notification to grant patent right for invention in CN202210472444.X, dated Jan. 5, 2023.

* cited by examiner

`US 11,854,745 B2`

MODIFIED NI—TI—TA DIELECTRIC MATERIAL FOR MULTI-LAYER CERAMIC CAPACITOR AND LOW-TEMPERATURE PREPARATION METHOD THEREOF

TECHNICAL FIELD

The disclosure relates to the field of electronic ceramics and manufacture thereof, and more particularly to a modified nickel-titanium-tantalum (Ni—Ti—Ta) dielectric material for multi-layer ceramic capacitor (MLCC) and a low-temperature preparation method thereof.

BACKGROUND

With the rapid development of the 5th generation mobile communication technology (5G), mobile communication is developing towards high frequency, and requirements of integration, miniaturization and high performance of electronic components are gradually improved. MLCC has many advantages, such as small volume, large specific volume, long service life, high safety, and can be used in high-frequency conditions, which play a great role in the field of communication.

MLCC includes three parts: an internal electrode, a terminal electrode and a ceramic dielectric layer, in which the internal electrode, such as a silver (Ag) electrode or a platinum (Pt) electrode, and the ceramic dielectric layer are parallel to each other to form a main body, and the terminal electrode generally has a three-layer structure: an innermost layer plays a link role and leads out the internal electrode; a middle layer is a blocking layer, which mainly prevents Ag from being corroded by molten solder during welding; and an outermost layer is a welding layer. The classification of ceramic capacitors is often expressed by a temperature coefficient $\tau_\varepsilon$ of dielectric constant of the used dielectric ceramic. According to the RS-198 standard of electronic components industry association (ECIA) in the United Stated of America (U.S.A), the dielectric ceramics can usually be divided into three classes according to their temperature stability, the class I ceramic, the class II ceramic and the class III ceramic.

Specifically, the class I ceramic capacitors have high stability and low loss, and are the most widely used in radio frequency (RF) and microwave communication. Naming rules vary according to temperature characteristics of the dielectric constant. For example, ceramic capacitors with S2G temperature characteristics refer to a temperature drift of $-330\pm30$ ppm/° C. in a temperature range of $-55°$ C. to $85°$ C., which can be used to prepare transmitter and receiver (T/R) components of phased-array radars, RF power amplifiers, transmitters and other circuits for coupling, coordination and filtering.

The dielectric materials for the class I ceramic capacitors include magnesium oxide-titanium dioxide ($MgO-TiO_2$) and barium oxide-titanium dioxide ($BaO-TiO_2$), such as magnesium titanium oxide ($MgTiO_3$) and barium titanate ($BaTi_4O_9$). However, the excessive sintering temperature ($\geq 1350°$ C.) increases energy consumption and cost, which limits the practical application of the dielectric materials. $Ni_{0.5}Ti_{0.5}TaO_4$ is a new type of material with intermediate trirutile structure, its sintering temperature is $1350°$ C., and its dielectric properties are excellent: $\varepsilon_r$ is 39.8, Q×f is 25051 GHz. However, the higher sintering temperature affects its dielectric properties, which limits its specific application.

SUMMARY

The purpose of the disclosure is to provide a modified Ni—Ti—Ta dielectric material for multi-layer ceramic capacitor and its low-temperature preparation method, in response to technical problems of $Ni_{0.5}Ti_{0.5}TaO_4$ matrix in the related art, thereby to overcome the technical problems of the $Ni_{0.5}Ti_{0.5}TaO_4$ matrix that cannot balance low sintering temperature and excellent dielectric properties.

In order to achieve the above purpose, the disclosure adopts the following technical scheme.

A modified Ni—Ti—Ta dielectric material for multi-layer ceramic capacitor is provided, a chemical formula of the modified Ni—Ti—Ta dielectric material is as follows: $[Cu_{0.1}Ni_{0.9}]_{0.5}[Ti_{0.92}(Al_{1/2}Nb_{1/2})_{0.08}]_{0.5}TaO_4$, a sintering temperature of the modified Ni—Ti—Ta dielectric material is in a range of $1050°$ C. to $1150°$ C. A crystal structure of a ceramic material (i.e., modified Ni—Ti—Ta dielectric material) belongs to a $Ni_{0.5}Ti_{0.5}TaO_4$ phase solid solution structure, a dielectric constant is in a range of 34 to 40, a dielectric loss is in a range of $2.8\times10^{-4}$ to $3.3\times10^{-4}$, a quality factor Q×f value is in a range of 22000 GHz to 25000 GHz, and a temperature coefficient of dielectric constant is stable and meets S2G temperature characteristics ($-55°$ C.: $-334$ ppm/° C.; $85°$ C.: $-338$ ppm/° C.)

In an embodiment, when the sintering temperature is $1150°$ C., the dielectric constant is 39.8, the dielectric loss is as low as $2.8\times10^{-4}$, and the quality factor Q×f value is as high as 24308 GHz, and the temperature coefficient of dielectric constant is stable and meets R2G temperature characteristics ($-55°$ C.: $-196$ ppm/° C.; $85°$ C.: $-202$ ppm/° C.).

A method for preparing the above modified Ni—Ti—Ta dielectric material for multi-layer ceramic capacitor includes the following steps:

step 1, mixing raw powders of cupric oxide (CuO), nickel oxide (NiO), $TiO_2$, aluminium oxide ($Al_2O_3$), niobium oxide ($Nb_2O_5$) and tantalic oxide ($Ta_2O_5$) according to the chemical formula of $[Cu_{0.1}Ni_{0.9}]_{0.5}[Ti_{0.92}(Al_{1/2}Nb_{1/2})_{0.08}]_{0.5}TaO_4$ to obtain a mixed powder;

step 2, putting the mixed powder prepared in step 1 into a ball milling tank, performing planet ball milling for 4~6 hours according to a mass ratio of the mixed powder:zirconium balls:deionized water of 1:4-6:5-7 to obtain a mixed slurry, drying the mixed slurry in an oven after the ball milling and then sieving with a 40~200 mesh sieve to obtain a sieved powder; and sintering the sieved powder in an atmosphere of 900-1100° C. for 3~5 hours to obtain a sintered powder;

step 3, performing planet ball milling on the sintered powder obtained in step 2 for 4~6 hours according to a mass ratio of the sintered powder:zirconium balls:deionized water of 1:4-6:3-5 to obtain a ball-milled material, and adding a polyvinyl alcohol solution into the ball-milled material after drying the ball-milled material as a binder to perform granulation to obtain a ceramic raw material; and step 4, performing press-molding on the ceramic raw material prepared in step 3, heating at a heating rate of 2~5° C./min and discharging glue at 600~650° C. for 3~5 hours, and then heating at the same heating rate to a temperature of 1050~1150° C. and keeping the temperature for 4~6 hours, thereby obtaining a modified $[Cu_{0.1}Ni_{0.9}]_{0.5}[Ti_{0.92}(Al_{1/2}Nb_{1/2})_{0.08}]_{0.5}TaO_4$ dielectric ceramic material (i.e., modified Ni—Ti—Ta dielectric material).

Ni—Ti—Ta ceramic systems belong to the trirutile structure, in which Ni and Ta1 occupy cationic lattice, while Ti and Ta2 occupy another cationic lattice. Because the $Cu^{2+}$ ion and $(Al_{1/2}Nb_{1/2})^{4+}$ ion respectively have similar radii to Ni and Ti elements, they can undergo substitution reaction and form the solid solution. Due to the combined effect of composite ion doping and the lower sintering temperature of CuO, Ni—Ti—Ta ceramics can show excellent microwave dielectric properties at the lower sintering temperature. Therefore, the modified Ni—Ti—Ta dielectric material for multi-layer ceramic capacitor and the preparation method thereof provided by the disclosure adopt a composite ion doping modification process, and introduce composite ions of $Cu^{2+}$, $Al^{3+}$ and $Nb^{5+}$ into the $Ni_{0.5}Ti_{0.5}TaO_4$ matrix for partial substitution, so as to significantly reduce the sintering temperature and provide a negative temperature coefficient of dielectric constant of $-220\pm30$ ppm/° C. at the same time, and reduce the deterioration factors of the loss caused by sintering aids, thereby to prepare the dielectric material applied to RF MLCC with low loss, low cost and good process stability.

DETAILED DESCRIPTION OF EMBODIMENTS

The disclosure will be further described in detail with the attached drawings and embodiments.

A method for preparing a modified Ni—Ti—Ta dielectric material for multi-layer ceramic capacitor is provided and includes the following steps.

Step 1, mixing raw powders of CuO, NiO, $TiO_2$, $Al_2O_3$, $Nb_2O_5$ and $Ta_2O_5$ according to the chemical formula of $[Cu_{0.1}Ni_{0.9}]_{0.5}[Ti_{0.92}(Al_{1/2}Nb_{1/2})_{0.08}]_{0.5}TaO_4$ to obtain a mixed powder.

Step 2, putting the mixed powder prepared in step 1 into a ball milling tank, performing planet ball milling for 6 hours according to a mass ratio of the mixed powder: zirconium balls:deionized water of 1:6:5 to obtain a mixed slurry, drying the mixed slurry in an oven after the ball milling and then sieving with a 200 mesh sieve to obtain a sieved powder; and sintering the sieved powder in an atmosphere of 1000° C. for 5 hours to obtain a sintered powder.

Step 3, performing planet ball milling on the sintered powder obtained in step 2 for 6 hours according to a mass ratio of the sintered powder:zirconium balls:deionized water of 1:6:3 to obtain a ball-milled material, and adding an 8% polyvinyl alcohol solution into the ball-milled material after drying the ball-milled material as a binder to perform granulation to obtain a ceramic raw material.

Step 4, performing press-molding on the ceramic raw material prepared in step 3, then heating at a heating rate of 5° C./min and discharging glue at 650° C. for 4 hours, and then heating at the same heating rate to a temperature of 1050~1150° C. and keeping the temperature for 6 hours, thereby obtaining a modified $[Cu_{0.1}Ni_{0.9}]_{0.5}[Ti_{0.92}(Al_{1/2}Nb_{1/2})_{0.08}]_{0.5}TaO_4$ dielectric ceramic material.

Figure 1:
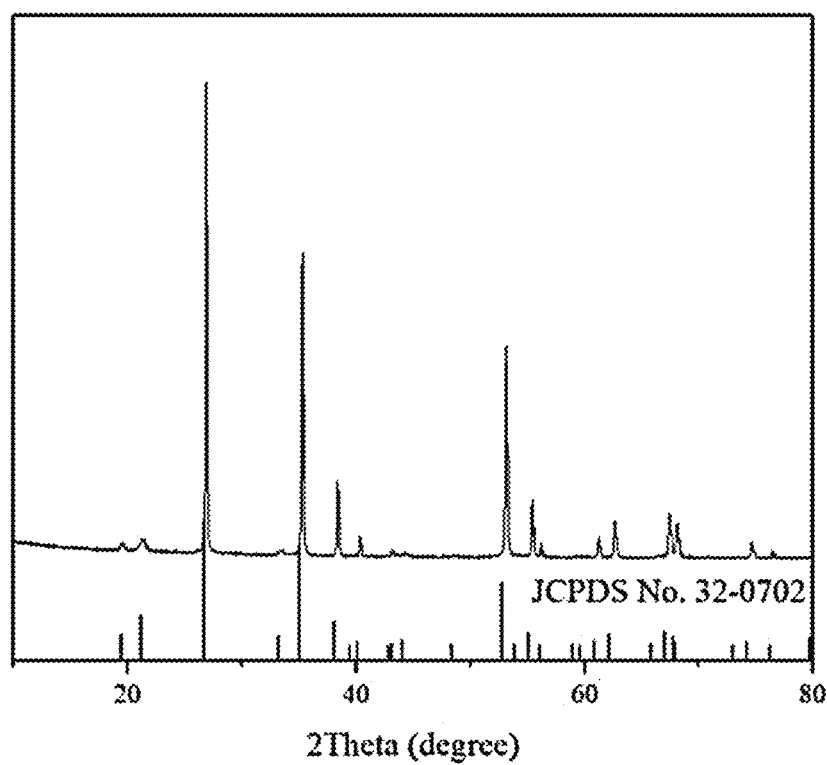
FIG. 1 illustrates a schematic diagram of an X-ray diffraction (XRD) pattern according to an embodiment 3 of the disclosure.

In order to better illustrate the effect of the disclosure, three embodiment samples are made according to the above steps. FIG. 1 is the XRD pattern of Embodiment 3. After searching, the phase composition of the ceramic corresponds to the standard card of $Ni_{0.5}Ti_{0.5}TaO_4$, i.e. joint committee on powder diffraction standards (JCPDS) card with No. 32-0702, no second phase diffraction peak is found in the system at this time, which indicates that ion substitution will not change the crystal structure at this doping amount, and this type of ceramic belongs to the $Ni_{0.5}Ti_{0.5}TaO_4$ structure.

Figure 2:
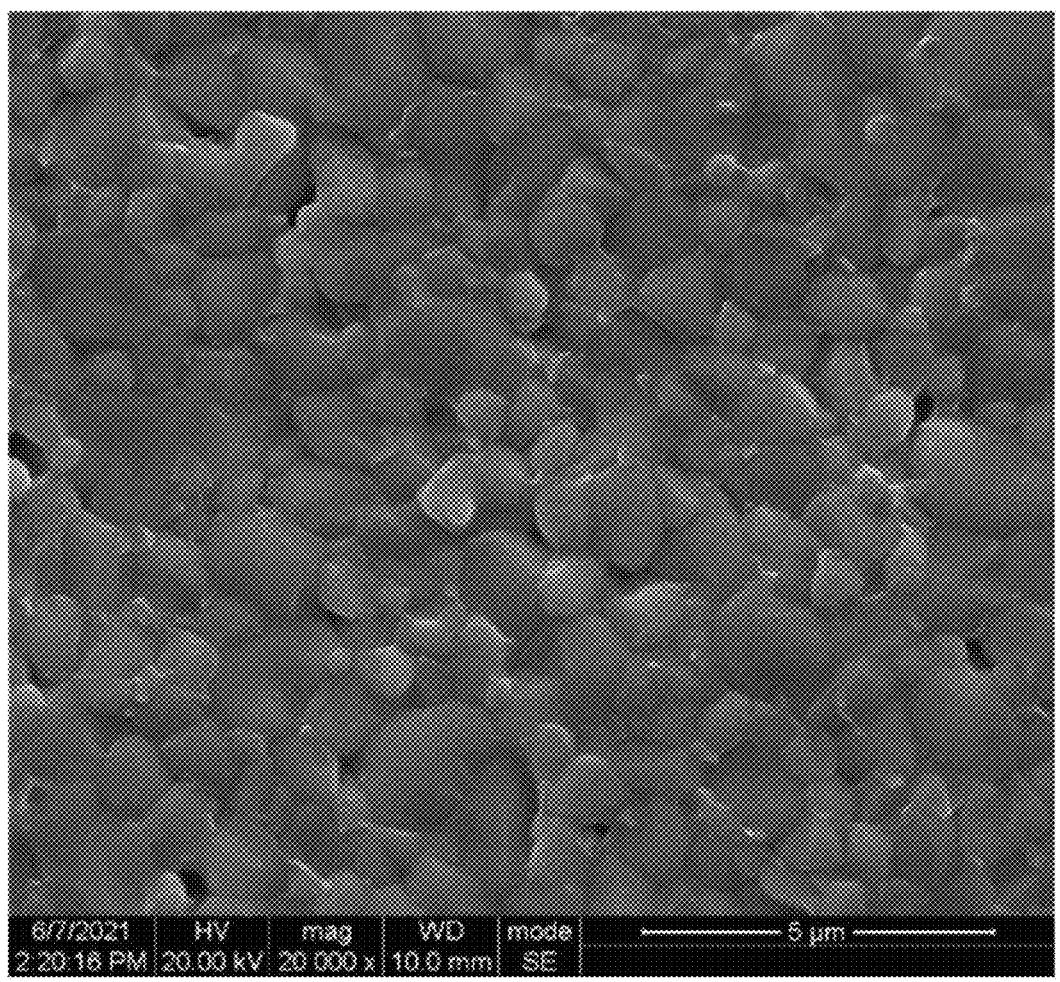
FIG. 2 illustrates a schematic diagram of scanning electron microscope (SEM) according to the embodiment 3 of the disclosure.

FIG. 2 is a SEM topography diagram of Embodiment 3. At this sintering temperature, the grain growth is sufficient, the grain size is small, and there are fewer pores in the microstructure.

The composition and microwave dielectric properties of the embodiments are shown in Table 1 and Table 2 as follows.

Table 1 shows the components of each embodiment sample.

|  |  | Embodiment number | | |
|---|---|---|---|---|
|  |  | 1 | 2 | 3 |
| Mass of each component | CuO | 1.330 | 1.330 | 1.330 |
|  | NiO | 11.243 | 11.243 | 11.243 |
|  | $TiO_2$ | 12.289 | 12.289 | 12.289 |
|  | $Al_2O_3$ | 0.341 | 0.341 | 0.341 |
|  | $Nb_2O_5$ | 0.889 | 0.889 | 0.889 |
|  | $Ta_2O_5$ | 73.907 | 73.907 | 73.907 |
| Sintering temperature (° C.) | | 1050 | 1100 | 1150 |

Table 2 shows the dielectric properties of each embodiment sample.

| Embodiment number | dielectric constant $\varepsilon_r$ | Tanδ ($10^{-4}$) | Q * f (GHz) | $\tau_\varepsilon$ (ppm/° C.) -55° C. | 85° C. |
|---|---|---|---|---|---|
| 1 | 34.8 | 3.3 | 22041 | -171 | -179 |
| 2 | 38.1 | 3.0 | 22532 | -178 | -185 |
| 3 | 39.8 | 2.8 | 24308 | -196 | -202 |

From the data shown in Table 1 and Table 2, it can be seen that in Embodiment 3, when the sintering temperature is 1150° C., the dielectric constant and Q×f value of the modified $[Cu_{0.1}Ni_{0.9}]_{0.5}[Ti_{0.92}(Al_{1/2}Nb_{1/2})_{0.08}]_{0.5}TaO_4$ dielectric ceramic material get the best values: $\varepsilon_r$=39.8, Tan δ=$2.8\times10^{-4}$, Q×f=24308 GHz, and $\tau_\varepsilon$ is in the range of -202 ppm/° C. to -196 ppm/° C. Compared with literature reports in the related art, the sintering temperature is greatly reduced and the dielectric loss is kept low, at the same time, the temperature coefficient of dielectric constant is relatively stable in the range of -55° C. to 85° C., the modified dielectric ceramic material is suitable for industrial application.

What is claimed is:

1. A modified nickel-titanium-tantalum (Ni—Ti—Ta) dielectric material for multi-layer ceramic capacitor, wherein a chemical formula of the modified Ni—Ti—Ta dielectric material is as follows: $[Cu_{0.1}Ni_{0.9}]_{0.5}[Ti_{0.92}(Al_{1/2}Nb_{1/2})_{0.08}]_{0.5}TaO_4$, and a sintering temperature of the modified Ni—Ti—Ta dielectric material is in a range of 1050° C. to 1150° C.; a crystal structure of the modified Ni—Ti—Ta dielectric material belongs to a $Ni_{0.5}Ti_{0.5}TaO_4$ phase solid solution structure, a dielectric constant of the modified Ni—Ti—Ta dielectric material is in a range of 34 to 40, and a dielectric loss of the modified Ni—Ti—Ta dielectric material is in a range of $2.8\times10^{-4}$ to $3.3\times10^{-4}$, a quality factor Q×f value of the modified Ni—Ti—Ta dielectric material is in a range of 22000 GHz to 25000 GHz, and a temperature coefficient of dielectric constant is stable and meets R2G temperature characteristics.

2. The modified Ni—Ti—Ta dielectric material for multi-layer ceramic capacitor according to claim 1, wherein when the sintering temperature is 1150° C., the dielectric constant is 39.8, the dielectric loss is $2.8 \times 10^{-4}$, the quality factor Q×f value is 24308 GHz, and the temperature coefficient of dielectric constant is stable and meets R2G temperature characteristics.

3. A method for preparing the modified Ni—Ti—Ta dielectric material for multi-layer ceramic capacitor according to claim 1, comprising:

step 1, mixing raw powders of cupric oxide (CuO), nickel oxide (NiO), $TiO_2$, $Al_2O_3$, $Nb_2O_5$ and $Ta_2O_5$ according to the chemical formula $[Cu_{0.1}Ni_{0.9}]_{0.5}[Ti_{0.92}(Al_{1/2}Nb_{1/2})_{0.08}]_{0.5}TaO_4$ to obtain a mixed powder;

step 2, putting the mixed powder prepared in step 1 into a ball milling tank, performing planet ball milling for 4~6 hours according to a mass ratio of the mixed powder:zirconium balls:deionized water of 1:4-6:5-7 to obtain a mixed slurry, drying the mixed slurry in an oven after the ball milling and then sieving with a 40-200 mesh sieve to obtain a sieved powder; and sintering the sieved powder in an atmosphere of 900-1100° C. for 3~5 hours to obtain a sintered powder;

step 3, performing planet ball milling on the sintered powder obtained in step 2 for 4~6 hours according to a mass ratio of the sintered powder:zirconium balls:deionized water of 1:4-6:3-5 to obtain a ball-milled material, and adding a polyvinyl alcohol solution into the ball-milled material after drying the ball-milled material as a binder to perform granulation to obtain a ceramic raw material; and step 4, performing press-molding on the ceramic raw material prepared in step 3, heating at a heating rate of 2~5° C./min and discharging glue at 600~650° C. for 3~5 hours, and then heating at the same heating rate to a temperature of 1050~1150° C. and keeping the temperature for 4~6 hours, thereby obtaining a modified $[Cu_{0.1}Ni_{0.9}]_{0.5}[Ti_{0.92}(Al_{1/2}Nb_{1/2})_{0.08}]_{0.5}TaO_4$ dielectric ceramic material.

* * * * *